Dec. 19, 1961     A. S. VOLPIN     3,013,769
PRESSURE SEALED VALVE
Filed March 15, 1961     3 Sheets-Sheet 1
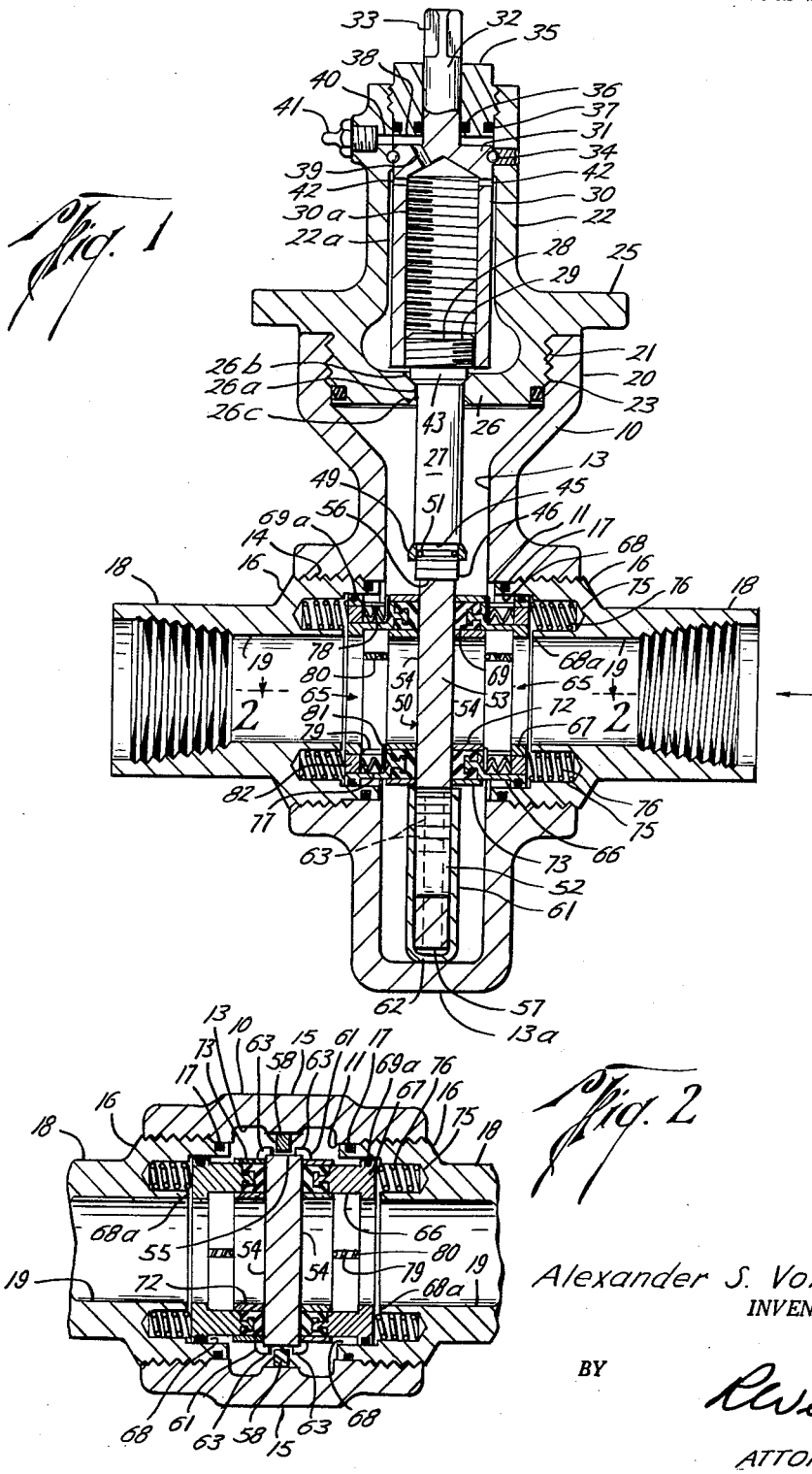
Alexander S. Volpin
INVENTOR.
BY
ATTORNEY Alexander S. Volpin
INVENTOR.

BY

ATTORNEY

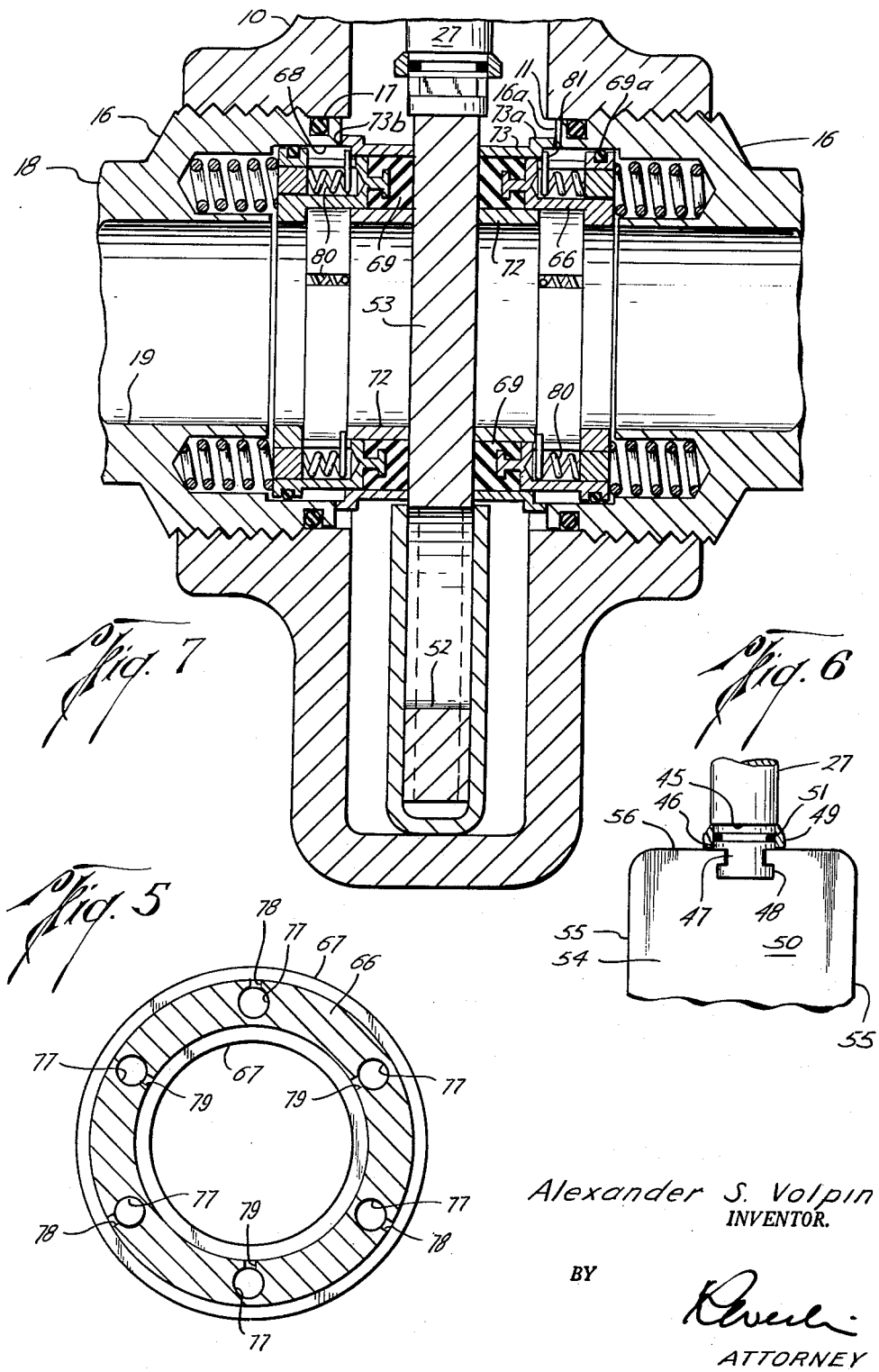

United States Patent Office 3,013,769
Patented Dec. 19, 1961

3,013,769
PRESSURE SEALED VALVE
Alexander S. Volpin, 10200 W. Broadview Drive,
Miami Beach, Fla.
Filed Mar. 15, 1961, Ser. No. 96,004
16 Claims. (Cl. 251—174)

This invention relates to improvement in valves and more particularly to improvements in gate valves of the through-conduit type.

Gate valves, particularly of the through-conduit type, are commonly made in relatively large sizes for use, for example, in large diameter oil and gas pipe lines where they are subjected to high pressures and may require frequent opening and closing under such conditions. The sizes of the valves and the conditions of the service in which they are employed makes imperative efficient sealing of the gate valve when closed and relative ease of operation in opening and closing of the valve.

Various types of sealing arrangements have heretofore been employed in such valves, as well as in other types of gate valves. One very useful system, illustrated in my U.S. Patent Reissue No. 23,957, includes automatic lubricant sealing employing a viscous grease or the like, as the sealant to supplement the metal-to-metal seal between the gate faces and the gate seats, the sealant being delivered to the sealing surfaces automatically by differential line pressure across the valve. While such sealing system has proven exceptionally efficient in service, the valve construction requiring, as it does, sealant reservoirs and groove systems with connecting passages, is relatively complex in construction and relatively expensive to manufacture.

Other systems employ non-metallic inserts, such as sealing rings constructed of rubber-like or plastic bodies positioned in the gate seats. While this type of sealing system is relatively simple, as compared with the automatic lubricant sealing system, it is subject to many disadvantages, particularly due to the high rate of erosion and damage to the seal through operation of the valve under high pressure.

Such seal elements, once the sealing surfaces are scratched or otherwise damaged by abrasion or erosion due to foreign matter in the fluid being controlled by the valve, must be replaced. Such damage can occur very readily as a result of the high pressure and the sliding movement of the gate relative to the seal element, particularly where imperfections are present or occur in the metal surfaces which engage the seal element. This often results in the necessity for replacement of the seal elements at frequent intervals, particularly where service conditions are severe, and the resulting shut-downs for replacement are both troublesome and expensive. Moreover, because of frictional forces developed in the more conventional sealing arrangements, movement of the gate member under high pressure conditions may prove difficult in many instances.

It is a primary object of the present invention to provide a gate valve having a sealing arrangement which embodies the advantages of the automatic lubricant sealing system with those of the non-lubricant sealing system, above described, but without the disadvantages of both systems. Accordingly, it is a primary object of the present invention to provide a gate valve employing automatic sealing by means of a plastic seal element in which the seal element is automatically urged into sealing engagement with the gate faces under line pressure differential, and which is "self-feeding" in order to continuously present new sealing material to the sealing surface when erosion occurs.

An important object is the provision of a seat unit for use with valves employing a plastic sealing element for sealing with the valve surface.

In accordance with one embodiment of the present invention, the seat unit comprises a metallic ring member to the forward end face of which there is vulcanized, or otherwise suitably fixed, a plastic sealing ring adapted to engage a valve face. The inner and outer peripheries of the sealing ring and the contiguous portion of the ring member are slidably enclosed between metal confining rings which are individually resiliently biased forwardly so as to be urged against the valve face to which the sealing ring is applied, and to thereby effectively confine the plastic sealing ring against radial extrusion under the sealing pressures. The seat unit is slidably mounted in the valve flowway and is arranged to be resiliently biased toward the valve face and suitably sealed in the flowway so that line pressure will effectively urge the unit into sealing engagement with the valve face under line pressure differentials.

The seal element employed in the structures, in accordance with the present invention, which I have termed broadly "plastic," is preferably a deformable, non-metallic material which may or may not be resilient, depending upon the service in which it is used, and may comprise one of the numerous molded rubber compounds, artificial rubbers, such as those well-known by the trade names "Neoprene" and "Hycar." Particularly useful for the seal elements in this invention, are the fluorocarbons, which are extremely tough materials resistant to almost all forms of chemical action, and which, most importantly, have a very low coefficient of friction. These are sold under various trade names, among the best known being "Teflon" and "Kelef." The low coefficient of friction of these materials is of special advantage in reducing the power required for opening and closing the valve gate under high pressure.

A further object of this invention contemplates the provision of an improved form of bonnet construction for gate valves, particularly of the rising stem type. The bonnet construction contemplated employs a housing to enclose the upper end of the gate stem and employs novel stuffing box arrangements for effectively sealing the stem at both terminal positions of the valve.

Other and more specific objects and advantages of the present invention will become more readily apparent from the following detailed description when read in conjunction with the accompanying drawing which illustrates a useful form of the invention and a modification thereof.

In the drawing.

FIG. 1 is a longitudinal vertical sectional view of a gate valve, in accordance with one embodiment of this invention, the gate member being shown in closed position;

FIG. 2 is a transverse cross-sectional view taken generally along line 2—2 of FIG. 1;

FIG. 5 is a cross-sectional view taken along line 5—5 of FIG. 4;

FIG. 6 is a fragmentary view, partly in section, of a detail of the gate member; and FIG. 7 is an enlarged fragmentary vertical sectional view generally similar to FIG. 1, illustrating a modification of the invention.

Figure 3:
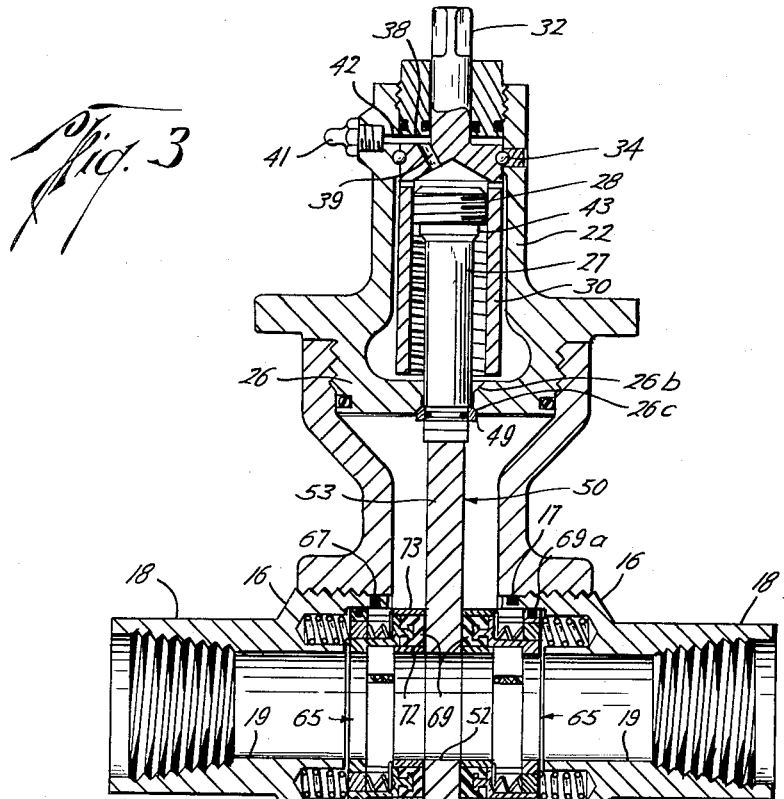
FIG. 3 is a view similar to FIG. 1, but showing the gate member in open position.

Referring to the drawing, the valve comprises a hollow body 10 having co-axial flow ports 11—11 communicating with the interior of the body, which defines a gate chamber 13 closed by a lower end wall 13a and side walls 15—15 (FIG. 2). Flow ports 11—11 are internally threaded at 14—14 to receive the threaded end portions 16—16 of tubular flow nozzles 18—18 having registering bores 19—19 defining the flowway through the valve. Seal packings 17—17 are disposed between the inner ends of nozzles 18 and the walls of the flow ports. It will be understood that either of the flow ports and its flow nozzle may be the inlet and the other the outlet of the valve. The outer ends of the flow nozzles may be internally threaded, as indicated, for connection into a pipe line or may have other connection elements, such as flanges or other conventional coupling devices for connecting the valve into a pipe line.

The upper end of body 10 is enlarged to form a bonnet-receiving neck 20, which is internally threaded at 21 to receive a generally tubular bonnet member 22 having a bore 22a. The lower end of bonnet member 22 is externally threaded at 23 to be received by threads 21. A packing ring 24, such as an O-ring, is installed between the inner end of bonnet 22 and the wall of neck 20 to form a fluid-tight seal therewith. Bonnet 22 is formed with a radially projecting flange 25 at a point just above threads 23 to bear against the upper end of neck 20 when the bonnet is screwed into place in the latter. The lower end of bonnet 22 has a lower end wall 26 provided with an axial opening 26a communicating between bore 22a and gate chamber 13. The upper and lower edges of opening 26a are bevelled to form seats 26b and 26c, respectively, for purposes to be described hereinafter. A cylindrical gate stem 27 extends through opening 26 for vertical reciprocation. The upper end of stem 27 is formed with an enlarged head 28 which is externally threaded at 29 for reception in the internally threaded bore 30a of a sleeve drive nut 30 which is mounted for rotation in bore 22a of the bonnet. The upper end of bore 30a of the sleeve nut is closed by means of an end section 31 which has integrally formed therewith an upwardly extending shaft 32 which projects above the upper end of bonnet 22. The upper end 33 of shaft 32 is made non-circular to receive an operating wheel or power operator (not shown) for turning the sleeve nut. Antifriction bearings 34 are suitably mounted in cooperating races formed in adjacent surfaces of end section 31 and the bonnet to facilitate turning of the sleeve nut. A tubular bushing 35 is screwed into the upper end of bonnet 22 surrounding stem 32 and is provided with inner and outer seals 36 and 37 to providee fluid-tight sealing between stem 32 and the inner wall of bonnet 22. The inner end of bushing 35 terminates a short distance above end section 31 to provide an annular space 38 which is in communication with a passage 39 leading through end section 31 into communication with the upper end of bore 30a. A passage 40 is provided radially through the wall of bonnet 22 registering with annular space 38 and a conventional pressure lubricant fitting 41 is screwed into the outer end of passage 40 through which lubricant may be supplied to bore 30a. Lateral ports 42—42 are provided through the wall of sleeve nut 30 near its upper end to communicate bore 30a of the sleeve nut with bore 22a of the bonnet.

Stem 27 is provided at a point immediately below head 28 with an annular enlargement 43 having a bevelled lower edge forming a seating shoulder adapted to engage upper seat 26b (FIG. 1) when stem 27 attains the limit of its downward movement during operation as will be subsequently described. As best seen in FIG. 6, the lower end of stem 27 is reduced somewhat in diameter to form the downwardly facing annular shoulder 45 and a terminal portion 46 for attachment to a gate member, designated generally by the numeral 50. Portion 46 has a non-circular section 47 just above its lower end to form a generally T-shaped key which is receivable in a correspondingly shaped slot 48 formed centrally in the upper end of gate member 50. A seat ring 49 is mounted about terminal portion 46 of the stem in abutment with shoulder 45 and is held against downward movement by engagement with the upper end of gate 50. A seal ring 51 is mounted between seat ring 49 and the exterior of terminal portion 46 to form a fluid-tight seal therebetween. The upper edge of seat ring 49 is bevelled to cooperate with lower seat 26c on the bonnet when stem 27 moves to the upper end of its travel (FIG. 3).

Gate number 50 is of flat, one-piece construction, generally rectangular in shape and provided in its lower portion with a through-conduit opening 52 adapted to register with the flowway through the valve when the gate member is moved to its upper position. (FIG. 3.) The imperforate upper portion of the gate member forms the closure 53 adapted to intersect the flowway when the gate member is in its lowermost position (FIG. 1). The flat rectangular shape of the gate member is defined by the flat parallel side faces 54—54, the parallel longitudinal edges 55—55, and the generally parallel top and bottom edges 56 and 57, respectively. Vertically extending, inwardly projecting guide rails 58—58 (FIG. 2) are mounted on the opposite side walls 15—15 of gate chamber 13 in registration with the longitudinal edges 55—55 of the gate member to limit lateral movement of the gate member in the gate chamber. A guide skirt 60, generally U-shaped in vertical section (FIGS. 1 and 3), is mounted in the lower portion of the gate chamber and is shaped to slidably receive the lower portion of the gate member. The skirt comprises the parallel side plates 61—61 and the connecting bottom plate 62 which rests on bottom wall 13a of the valve casing. The side edges of side plates 61—61 are inwardly turned toward each other to form the flanges 63—63 (FIGS. 2 and 3) which terminate adjacent the opposite side edges of guide rails 58—58 and cooperate with the latter to maintain the gate member in proper alignment throughout its reciprocatory movements.

The gate member slides vertically in its opening and closing movements between a pair of seat units, each designated generally by the numeral 65. As the seat units are identical in construction, only one will be described in detail. A seat unit includes the metallic ring-shaped body 66 (see particularly FIGS. 4 and 5) terminating at its outer or rearward end in a radially enlarged annular flange 67. The body 66 is mounted for axial movement in a counterbore 68 in the inner end of bore 19, the bottom of the counterbore defining the forwardly facing annular shoulder 68a which limits rearward or outward movement of body 66. The periphery of flange 67 is provided with the annular groove 67a to receive a packing ring 69a adapted to provide a fluid-tight slidable seal with the wall of counterbore 68. The forward end of body 66 has vulcanized or otherwise suitably secured thereto a sealing ring 69 constructed of one of the nonmetallic plastic materials previously mentioned. The forward end of body 66 may have a forwardly projecting T-shaped annular flange or rib 70 or similar projection adapted to function as an insert in the body of ring 69 when the latter is vulcanized to the body to aid in strongly securing ring 69 to body 66. The internal and external diameters of ring 69 are made substantially flush with those of the contiguous end portion of body 66 and the forward end face 71 of ring 69 is made substantially flat. Rigid inner and outer confining rings 72 and 73, respectively, constructed of steel or other strong material, are disposed in axially slidable engagement with the respective inner and outer peripheries of ring 69 and body 66. Rings 72 and 73 are made longer than sealing ring 69 in order to project rearwardly over the forward end of body 66 and are slidable over the body.

A plurality of angularly spaced sockets 75 are formed in annular shoulder 68a in registration with flange 67. Strong coil springs 76 are mounted in sockets 75 in compression between flange 67 and the bottoms of the socket 69 to resiliently bias the seat units forwardly to continuously urge sealing ring 69 into compressive engagement with side face 54 of the gate member.

Figure 4:
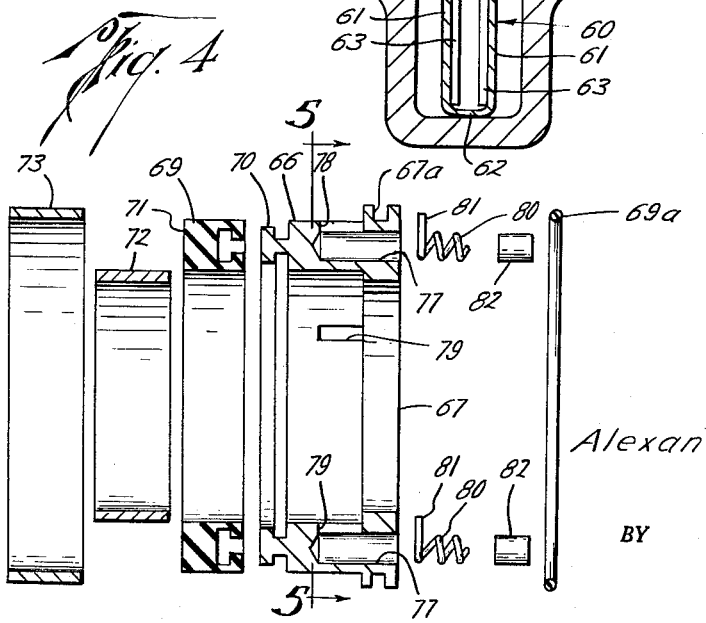
FIG. 4 is an exploded view in longitudinal section of one of the seat units in accordance with this invention.

A plurality of angularly spaced sockets 77 extend forwardly into body 66 from its rearward end (FIGS. 4 and 5). Alternate ones of the sockets 77 open through longitudinal slots 78 to the exterior of body 66 forwardly of flange 67 and the intervening ones of sockets 77 open through similar slots 79 to the interior of body 66 forwardly of flange 67. Coil springs 80 are mounted in each of the sockets 77 and each spring has a lengthened forward end portion 81 which projects outwardly through the related slot. Those end portions projecting through slots 78 are adapted to engage the rearward edge of outer confining ring 73 at a plurality of angularly spaced points to resiliently bias the latter forwardly against the adjacent face 54 of the gate member. Those spring end portions projecting from slots 79 are adapted to engage the rearward edge of inner confining ring 72 at a plurality of angularly spaced points to resiliently bias the latter forwardly against the adjacent face 54 of the gate member. Metal plugs 82 are welded into the outer ends of socket 77 to hold springs 82 in compression. It will be understood that springs 80 are made substantially weaker than springs 76.

The valve, as above described, functions in the following manner: For purposes of this description, it will be assumed that flow through the valve is in the direction indicated by the arrow in FIG. 1, and that gate member 50 is in the closed position, also as illustrated in FIG. 1.

The upstream line pressure will act against the area of the upstream seat unit defined by O-ring seal 69 to urge the entire seat unit toward the upstream face of closure portion 53, thereby pressing end face 71 of the upstream sealing ring 69 against the opposed gate face. This line pressure will supplement the force of the strong springs 76 which will also be maintaining a continuous biasing force on the seat unit urging the sealing ring 69 into sealing engagement with the gate face. Sealing ring 69 will thus be held in tight sealing engagement against the upstream face of the gate member and the greater the differential pressure across the gate, the tighter will be this sealing engagement. Contemporaneously, the confining rings 72 and 73 of the upstream seat unit will be resiliently biased by means of the springs 80 into engagement with the upstream gate face and will function to confine the plastic material comprising sealing ring 69 against radial extrusion under the compressive forces being applied thereto by the line pressure and the force of springs 76. Since confining rings 72 and 73 are intended to function principally to enclose and confine the material comprising the sealing rings, springs 80 are made relatively light so that while serving to keep the forward ends of the confining rings in engagement with the gate face, the spring pressure will not be so great as to develop any substantial degree of friction with the gate surface which might tend to hinder the movement of the gate member. By making rings 72 and 73 somewhat longer than sealing ring 69, their rearward end portions will slide over the forward end portion of body 66 and serve as a lock or keeper for sealing ring 69 to prevent the latter from being twisted or otherwise forced off of the end of the body by the wiping action of the gate and by pressure forces during movement of the gate.

By employing a deformable plastic material, preferably one having a low coefficient of friction such as Teflon, movement of the gate member between open and closed position is facilitated and accomplished with minimum power requirement at the valve operator, while effecting strong sealing engagement with the gate face.

On the downstream side of the valve, the seat unit will be resiliently urged toward the downstream face of the gate member by the pressure of springs 76. The downstream sealing ring 69 thus will be maintained in sealing contact with the gate face and confined against extrusion by its confining rings 72 and 73 as in the case of the upstream seat unit. The force of springs 76 on the downstream side will oppose movement of the gate member in the downstream direction under the upstream forces on the gate member. Travel or movement of the gate member in the downstream direction will be limited by engagement of flange 67 with shoulder 68a in counterbore 68 of the downstream flow port. To additionally limit such travel by the gate member, outer confining ring 73 may be modified as illustrated in FIG. 7. In this modification all of the other parts of the gate member and the seat units are identical with those previously described and are designated by the same numerals. Each outer confining ring 73 is modified to be provided at its rearward end with a radially outwardly offset flange 73a. The extent of the offset is sufficient to allow the outer annular end face 73b of the ring to be in abuttable engagement with the inner end face 16a of end portions 16 of flow nozzles 18 when the seat unit is caused to move in the downstream direction by the upstream forces on the gate member. The projecting end portions 81 of the biasing springs 80 will continue to engage the rearward end of ring 73 in order to maintain the forwardly biasing force on the outer confining ring. The normal clearance between end face portion 73b and end face 16a will be made quite small and less than that normally existent between shoulder 68a and flange 67 so that the extent of downstream movement of the gate member may be held to a minimum, and the thrust of the gate member will be taken directly on the end of nozzle 18.

As wear of the working end faces 71 of the seal rings occurs, the resiliently biased arrangement of the seat units will serve to continuously feed new sealing surfaces into engagement with the gate faces while the relatively light forces biasing the confining rings will allow the latter to be stripped back off of the sealing rings as the latter are advanced to compensate for such wear. The confining rings will, however, continue to maintain their confining engagement with the gate faces.

The described arrangement by which new sealing surface will be continuously fed to the working face of the valve member greatly extends the working life of the seat seal with the result that the frequency of replacement of the sealing rings is greatly reduced even under the most severe service conditions. In this way, the action of the seat units may be likened to automatic lubricant sealing in that the sealing medium is continuously and automatically renewed as required.

Guide rails 58 and guide skirt 60 also cooperate with the gate member to maintain the latter in alignment during its reciprocation, both by limiting movement transversely of the axis of the flowway and by limiting movement in the direction of flow.

The valve of the illustrative embodiment may be described as an "enclosed rising-stem" type of gate valve in that although the stem rises and lowers in effecting movement of the gate member, the threaded upper end of the stem is enclosed within the valve bonnet and is thus concealed from external exposure and protected from dirt and other interfering conditions, as in the case of conventional non-rising stem gate valves, and unlike conventional rising-stem gate valves. The described arrangement wherein the sleeve nut which drives the stem and head 28 of the stem are enclosed within bore 22a of the bonnet, provides several functional features which are quite advantageous for through-conduit gate valves of the general character described when used in high pressure service.

Seat shoulders 43 and 49 are so spaced that when the gate member is in the closed position (FIG. 1) shoulder 43 will be in sealing engagement on seat 26b, thereby effectively assuring against leakage of line fluid into the bonnet and gate drive elements. This helps assure against entrance of corrosive, erosive or sticky and greasy materials which may be carried by the line fluid which might otherwise cause sticking or freezing of the operating mechanism, particulary where the valve is kept in the shut-off position for long periods of time.

In the open position of the gate member (FIG. 3), seat shoulder 49 will be in engagement with seat 26c, thereby again preventing entrance of line fluid into the bonnet section. Moreover, by sealing the bonnet thus in both the open and closed positions, leakage from the valve body in the event of failure of the gate seat units will be prevented while protecting the drive mechanism for the gate member as described.

Of course, when the gate member is in process of moving between open and closed positions, pressure will enter the bonnet and by provision of ports 42 will be communicated to bore 30a of the sleeve nut, thereby balancing the pressure across the gate stem. This balancing of the pressure will reduce the torque requirements for rotating the drive nut, thereby permitting shaft 32 to be made relatively small in diameter as compared with more conventional designs.

Lubricant will be introduced into bore 30a of sleeve nut 30 through fitting 41 and the several connecting passages 40, 38 and 39. This serves to lubricate both the threads and bearings 34, further reducing the torque requirements for operating the valve.

It will be evident that seat units 65 may be employed to seal between relatively movable surfaces other than the valve surfaces herein described. For example, seat units 65 are readily adaptable for use as shaft seals and may, therefore, be considered as novel sub-combination structures of more general application.

It will be understood that various alterations and modifications may be made in the details of the illustrative embodiments within the scope of the appended claims but without departing from the spirit of this invention.

What I claim and desire to secure by Letters Patent is:

1. In a valve, a housing having a chamber therein, a flowway intersecting said chamber and having an annular working surface, a valve member movable in said chamber between positions opening and closing said flowway, an annular seat member slidably disposed within said working surface, means sealing between said seat member and said working surface, means resiliently urging said seat member toward the adjacent face of said valve member, an annular non-metallic seal element mounted on an end of the seat member to sealingly engage said face of the valve member, a pair of rings of relatively rigid material slidably disposed about the inner and outer peripheries of said seal element to confine said seal element against radial deformation, and resilient means mounted on the seat member biasing both said rings toward said adjacent face of the valve member.

2. In a valve according to claim 1, wherein said seal element comprises a deformable plastic material characterized by a low coefficient of friction.

3. In a valve, a housing having a chamber therein, a flowway intersecting said chamber and having an annular working surface, a valve member movable in said chamber between positions opening and closing said flowway, an annular seat member slidably disposed within said working surface, means sealing between said seat member and said working surface, means resiliently urging said seat member toward the adjacent face of said valve member, an annular non-metallic seal element mounted on an end of the seat member coaxially therewith to sealingly engage said face of the seat member, the inner and outer peripheries of said seal element being substantially flush with those of the contiguous portion of said seat member, a pair of rings of relatively rigid material slidably disposed about the inner and outer peripheries of said seal element and said contiguous portion of the seat member to confine said seal element against radial deformation, and resilient means mounted on the seat member biasing both said rings toward said adjacent face of the valve member.

4. In a valve, a housing having a chamber therein, a flowway intersecting said chamber and having an annular working surface, a valve member movable in said chamber between positions opening and closing said flowway, an annular seat member slidably disposed within said working surface, means sealing between said seat member and said working surface, means resiliently urging said seat member toward the adjacent face of said valve member, an annular non-metallic deformable seal element having a low coefficient of friction mounted on one end of the seat member coaxially therewith to sealingly engage said face of the valve member, the inner and outer peripheries of said seal element being substantially flush with those of the contiguous portion of said seat member, a pair of rings of relatively rigid material slidably disposed about the inner and outer peripheries of said seal element and said contiguous portions of the seat member to confine said seal element against radial deformation, and separate resilient means mounted on the seat member independently biasing each of said rings toward said adjacent face of the valve member.

5. In a valve, a housing having a chamber therein, a pair of coaxial flow ports in said housing defining a flowway intersecting said chamber, a valve member movable in said chamber between said flow ports between positions opening and closing said flowway, a pair of annular seat units slidably mounted in the flow ports, and means resiliently biasing the seat units toward the opposed faces of said valve member, each of said seat units comprising an annular metallic body, means forming a slidable seal between the body and the flow port, an annular seal element secured to the forward end of said body coaxially therewith and having inner and outer peripheries substantially flush with those of the contiguous portion of said body, said seal element being constructed of a deformable non-metallic material characterized by a low coefficient of friction and having a forward end face adapted to sealingly engage the opposed face of said valve member, a pair of rings constructed of relatively rigid material concentrically disposed in close sliding engagement about the inner and outer peripheries of said seal element and said contiguous portion of said body to confine the seal element against radial deformation, and resilient means on said body biasing both said rings forwardly toward the opposed face of said valve member.

6. In a gate valve, a housing having a chamber therein, a pair of coaxial flow ports in said housing defining a flowway intersecting said chamber, a gate member having flat seat-engaging faces reciprocable in said chamber between said flow ports between positions opening and closing said flowway, a pair of annular seat units slidably mounted in the flow ports, and means resiliently biasing the seat units toward the opposed seat-engaging faces of said gate member, each of said seat units comprising an annular metallic body, means forming a slidable seal between the body and the flow port, an annular seal element secured to the forward end of said body coaxially therewith and having inner and outer peripheries substantially flush with those of the contiguous portion of said body, said seal element being constructed of a deformable non-metallic material characterized by a low coefficient of friction and having a substantially flat forward end face adapted to sealingly engage the opposed seat-engaging face of said gate member, a pair of rings constructed of relatively rigid material concentrically disposed in close sliding engagement about the inner and outer peripheries of said seal element and said contiguous portion of said body to confine the seal element against radial deformation, and resilient means on said body biasing both said rings forwardly against the opposed seat-engaging face of said gate member.

7. A sealing unit for sealing between two relatively movable surfaces, comprising, an annular body, an annular seal element secured to one end of said body coaxial therewith, the inner and outer peripheries of said seal element being substantially flush with those of the contiguous portion of said body, said seal element comprising, a non-metallic, deformable plastic material characterized by a low coefficient of friction, a pair of ring members constructed of relatively rigid material concentrically disposed in close sliding engagement about the inner and outer peripheries of said seal element and said contiguous portion of said body, the axial length of said ring members being somewhat greater than that of said seal element, and resilinet means on said body biasing both said ring members toward the free end of said seal element.

8. A sealing unit for sealing between two relatively movable surfaces, comprising, an annular body, an annular seal element secured to one end of said body coaxial therewith, the inner and outer peripheries of said seal element being substantially flush with those of the contiguous portion of said body, said seal element comprising a non-metallic, deformable plastic material characterized by a low coefficient of friction, a pair of ring members constructed of relatively rigid material concentrically disposed in close sliding engagement about the inner and outer peripheries of said seal element and said contiguous portion of said body, the axial length of said ring members being somewhat greater than that of said seal element, and separate resilient means on said body independently biasing each of said ring members toward the free end of said seal element.

9. A sealing unit for sealing between two relative movable surfaces, comprising, an annular body, an annular seal element secured to one end of said body coaxial therewith, the inner and outer peripheries of said seal element being substantially flush with those of the contiguous portion of said body, said seal element comprising a non-metallic, deformable plastic material characterized by a low coefficient of friction, a pair of ring members constructed of relatively rigid material concentrically disposed in close sliding engagement about the inner and outer peripheries of said seal element and said contiguous portion of said body, the axial length of said ring members being somewhat greater than that of said seal element, an annular seal packing disposed concentrically about the outer periphery of said body longitudinally spaced from said seal element, and separate resilient means on said body independently biasing each of said ring members toward the free end of said seal element.

10. A sealing unit for sealing between two relatively movable surfaces, comprising, an annular body, an annular rib integral with said body projecting from one end thereof, an annular seal element secured about said rib to said one end of said body and coaxial therewith, the inner and outer peripheries of said seal element being substantially flush with those of the contiguous portion of said body, said seal element comprising a non-metallic, deformable plastic material characterized by a low coefficient of friction, a pair of ring members constructed of relatively rigid material concentrically disposed in close sliding engagement about the inner and outer peripheries of said seal element and said contiguous portion of said body, the axial length of said ring members being somewhat greater than that of said seal element, and resilient means on said body biasing both said ring members toward the free end of said seal element.

11. A sealing unit for sealing between two relatively movable surfaces, comprising, an annular body, an annular body, an annular rib integral with said body projecting from one end thereof, an annular flange extending radially from the opposite end of said body, an annular packing-receiving groove in the periphery of said flange, an annular seal element secured about said rib to said one end of said body and coaxial therewith, the inner and outer peripheries of said seal element being substantially flush with those of the contiguous portion of said body, said seal element comprising a non-metallic, deformable plastic material characterized by a low coefficient of friction, a pair of ring members constructed of relatively rigid material concentrically disposed in close sliding engagement about the inner and outer peripheries of said seal element and said contiguous portion of said body, the axial length of said ring members being somewhat greater than that of said seal element, and separate resilient means on said body independently biasing each of said ring members toward the free end of said seal element.

12. In a valve, a housing having a chamber therein, a flowway intersecting said chamber and having an annular working surface, a valve member movable in said chamber between positions opening and closing said flowway, an annular seat member slidably disposed within said working surface, means sealing between said seat member and said working surface, means resiliently urging said seat member toward the adjacent face of said valve member, an annular non-metallic deformable seal element mounted on an end of the seat member to sealingly engage said face of the valve member, inner and outer rings of relatively rigid material slidably disposed respectively about the inner and outer peripheries of said seal element to confine said seal element against radial deformation, and resilient means mounted on the seat member biasing both said rings toward said adjacent face of the valve member, the outer one of said rings carrying means engageable with said housing to limit movement of said valve member toward said housing axially of said flowway.

13. In a valve, a housing having a chamber therein, a pair of coaxial flow ports in said housing defining a flowway intersecting said chamber, a valve member movable in said chamber between said flow ports between positions opening and closing said flowway, a pair of annular seat units slidably mounted in the flow ports, and means resiliently biasing the seat units toward the opposed faces of said valve member, each of said seat units comprising an annular metallic body, means forming a slidable seal between the body and the flow port, an annular seal element secured to the forward end of said body coaxially therewith and having inner and outer peripheries substantially flush with those of the contiguous portion of said body, said seal element being constructed of a deformable non-metallic material characterized by a low coefficient of friction and having a forward end face adapted to sealingly engage the opposed face of said valve member, inner and outer rings constructed of relative rigid material concentrically disposed in close sliding engagement about the inner and outer peripheries of said seal element and said contiguous portion of said body to confine the seal element against radial deformation, and resilient means on said body biasing both said rings forwardly toward the opposed face of said valve member, the outer one of said rings carrying means engageable with said housing to limit movement of the valve member axially toward said flow port whereby to transfer thrust of said valve member from the sealing element to said housing.

14. In a valve, a housing having a chamber therein, a flowway intersecting said chamber and having an annular working surface, a valve member movable in said chamber between positions opening and closing said flowway, an annular seat member slidably disposed within said working surface, means sealing between said seat member and said working surface, means resiliently urging said seat member toward the adjacent face of said valve member, an annular seal element of deformable plastic material mounted on an end of the seat member to sealingly engage said face of the valve member, a pair of rings of relatively rigid material slidably disposed about the inner and outer peripheries of said seal element to confine said seal element against radial deformation, and resilient means in the housing biasing both said rings toward said adjacent face of the valve member.

15. A sealing unit for sealing between two relatively movable surfaces, comprising, an annular body, an annular seal element secured to one end of said body coaxial therewith, the inner and outer peripheries of said seal element being substantially flush with those of the contiguous portion of said body, said seal element comprising a deformable plastic material, a pair of ring members constructed of relatively rigid material concentrically disposed in close sliding engagement about the inner and outer peripheries of said seal element and said contiguous portion of said body, the axial length of said ring members being somewhat greater than that of said seal element, and resilient means on said body biasing both said ring members toward the free end of said seal element.

16. A sealing unit for sealing between two relatively movable surfaces, comprising, an annular body, an annular seal element secured to one end of said body coaxial therewith, the inner and outer peripheries of said seal element being substantially flush with those of the contiguous portion of said body, said seal element comprising a deformable plastic material, a pair of ring members constructed of relatively rigid material concentrically disposed in close sliding engagement about the inner and outer peripheries of said seal element and said contiguous portion of said body, and resilient means on said body biasing both said ring members toward the free end of said seal element.

References Cited in the file of this patent

UNITED STATES PATENTS

| | | |
|---|---|---|
| 2,194,261 | Allen | Mar. 19, 1940 |
| 2,657,005 | Van Nest | Oct. 27, 1953 |
| 2,705,019 | Volpin | Mar. 29, 1955 |
| 2,777,664 | Bryant | Jan. 15, 1957 |
| 2,853,269 | Shand | Sept. 23, 1958 |
| 2,889,134 | Bryant | June 2, 1959 |

FOREIGN PATENTS

| | | |
|---|---|---|
| 671,546 | Great Britain | May 7, 1952 |